United States Patent [19]

Takanashi et al.

[11] Patent Number: 5,220,343
[45] Date of Patent: Jun. 15, 1993

[54] METHOD FOR TRANSFERRING HOT-MELT TRANSPARENT PROTECTIVE MATERIAL TO A RECORDING MEDIUM

[75] Inventors: Itsuo Takanashi, Kamakura; Hideshi Tanaka, Yokohama; Toshinori Takahashi, Kawasaki; Yutaka Mizoguchi, Koshigaya, all of Japan

[73] Assignee: Victor Company of Japan, Ltd., Yokohama, Japan

[21] Appl. No.: 748,414

[22] Filed: Aug. 22, 1991

[30] Foreign Application Priority Data

Aug. 23, 1990 [JP] Japan .................. 2-221850

[51] Int. Cl.$^5$ .............................................. G01D 9/00
[52] U.S. Cl. .................. 346/1.1; 346/76 PH; 400/120
[58] Field of Search ............ 400/237, 240, 240.1, 400/240.2, 240.3, 240.4; 346/120, 1.1, 76 PH

[56] References Cited

U.S. PATENT DOCUMENTS

| | | | |
|---|---|---|---|
| 4,527,171 | 7/1985 | Takanashi et al. | 346/76 PH |
| 4,815,872 | 3/1989 | Nagashima | 346/76 PH |

FOREIGN PATENT DOCUMENTS

| | | | |
|---|---|---|---|
| 0148778 | 9/1983 | Japan | 400/240.3 |
| 58-148779 | 9/1983 | Japan . | |
| 61-51391 | 3/1986 | Japan . | |
| 0154972 | 7/1986 | Japan | 400/240.4 |
| 0124991 | 6/1987 | Japan | 400/240.4 |
| 0169679 | 7/1987 | Japan | 400/240.4 |
| 0207656 | 9/1987 | Japan | 400/240.3 |
| 0022693 | 1/1988 | Japan . | |

Primary Examiner—Benjamin R. Fuller
Assistant Examiner—Huan Tran
Attorney, Agent, or Firm—Michael N. Meller

[57] ABSTRACT

A method for transferring a hot-melt transparent protective material comprising steps of; contacting an ink sheet on which one or more color hot-melt ink layers have been provided with a moving recording medium, pressing and heating a thermal head system having an array of heat elements from above the ink sheet to print desired information, contacting a protective material sheet on which a hot-melt transparent protective material layer has been provided, with a printed surface of the recording medium, and pressing and heating the thermal head system from above the protective material sheet to transfer the hot-melt transparent protective material onto a surface of the picture and to apply thereon an overcoat of the hot-melt transparent protective material having a specific pattern.

Another method for transferring a hot-melt transparent protective material comprises a step of transferring the hot-melt transparent protective material plural times onto the surface of the picture.

5 Claims, 9 Drawing Sheets

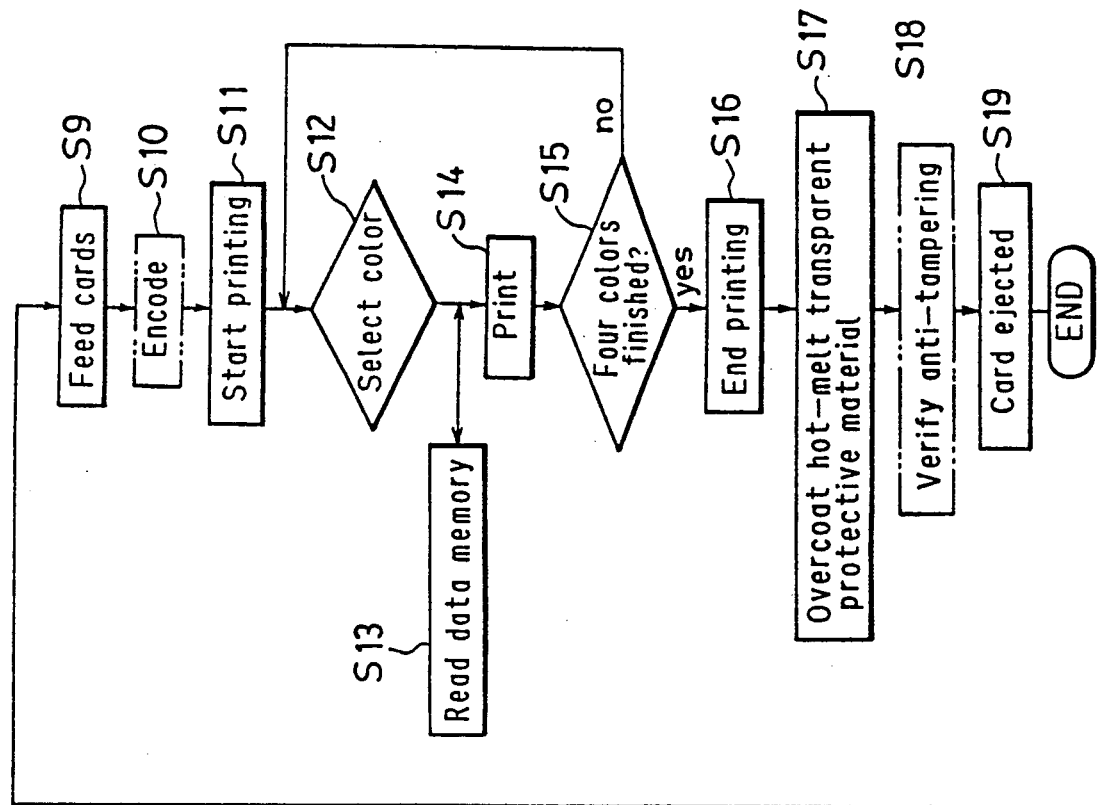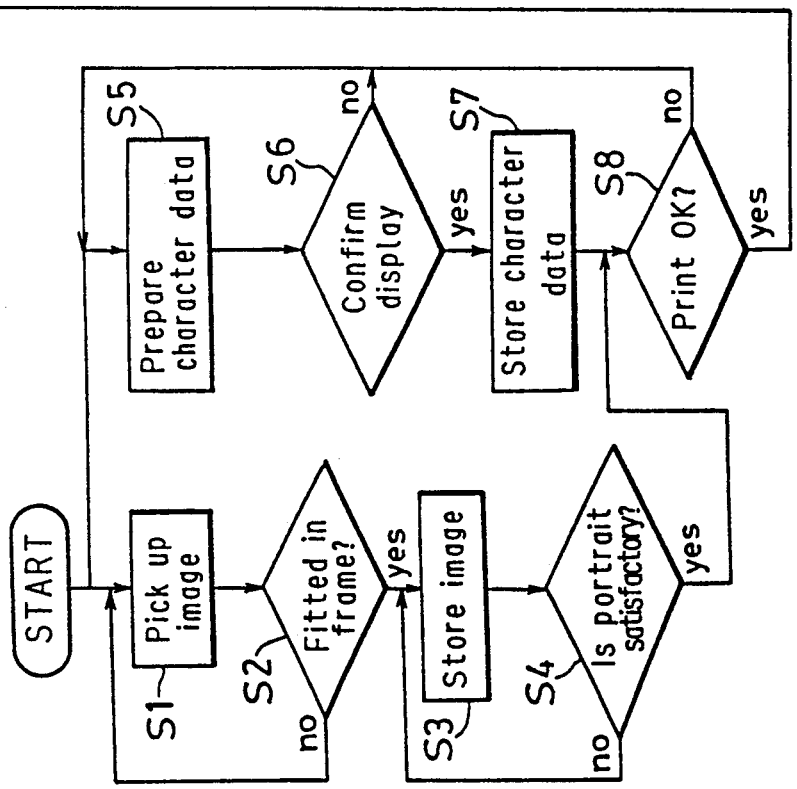
Fig. 4

Pattern of ink

Pattern of hot-melt transparent protective material

Moire pattern

Anti-tampering verifying unit 70

Pattern detector 73

METHOD FOR TRANSFERRING HOT-MELT TRANSPARENT PROTECTIVE MATERIAL TO A RECORDING MEDIUM

BACKGROUND OF THE INVENTION

1. Field of the Invention:

The present invention relates to a method for transferring thermally a hot-melt transparent protective material on a recording medium, a card for instance, after the card is printed with various information such as a person's portrait, name, code and the like thereon by a card publishing system for publishing such cards as ID cards for identification of employee or student, or cash dispensing cards to be published from banks or multipurpose IC embedded cards (hereinafter referred to as a "cards C").

2. Description of the Related Art:

Lately a card publishing system for preparing a desired image on a recording medium to be used as a card by a thermal transfer printer using no photographic papers has been developed. A card production system disclosed in Japanese Patent Application Laid-open No. 22693/1988 is shown in FIG. 1 as an example of the card publishing system.

Referring now to FIG. 1, image data inputted by an image pickup means 101, a TV camera for example, is stored in a memory 105 through a data processor 104. The stored image data is then displayed on a display 102 through the data processor 104.

A position data inputting means 103 for inputting position data manipulating a mouse, or a tablet digitizer and the like, is connected with the data processor 104 to input position data related to the displayed image on the display 102.

A character data inputting means 106 such as a keyboard or an optical character reader (OCR) is provided for inputting character data.

The image data is processed in a variety of ways by these devices and is then converted to printable image data by a data converter 107. The printable image data is then outputted to a thermal head 109 through a driver 108 of a thermal transfer sublimation type printer, for example, and is printed on a card C by means of an ink sheet T.

However, the image printed on the card C by the card production system shown in FIG. 1 is in a state where ink of the ink sheet T has been merely transferred to the surface of card C. Accordingly there have been such problems that this ink is easily discolored by ultra violet ray and the like, that is the card C lacks durability against frequent use, and that no anti-tampering means is provided even when, for example, a corporate seal and a signature are printed on the card.

While methods for applying a protective transparent film on the surface of a printed material by heating and pressing the film thereon have been disclosed in Japanese Patent Application Laid-open No. 102380/1982 and Japanese Patent Application Laid-open No. 147390/1983, the method has such a disadvantage that it requires so complex system that the production cost and the running cost for the production of the cards are high.

SUMMARY OF THE INVENTION

It is accordingly a general object of the present invention to overcome the aforementioned disadvantages by providing improved methods for transferring a hot-melt transparent protective material on a card.

It is more specific object of the present invention to provide another method which also allows to transfer the hot-melt transparent protective material uniformly on the card and to enhance the durability thereof.

It is another object of the present invention to provide another method that also allows to transfer the hot-melt transparent protective material uniformly to the card and to enhance the durability thereof.

The above general object is attained by a method for transferring a hot-melt transparent protective material to a recording medium comprising steps of:

contacting an ink sheet having at least one or more color hot-melt ink layers being provided thereon, with a moving recording medium;

pressing and heating a thermal head system having an array of heat elements from above the ink sheet to print certain information in each color to form a frame of picture on the moving recording medium;

contacting a protective material sheet having a hot-melt transparent protective material layer being provided thereon, with a printed surface of the recording medium; and pressing and heating the thermal head system from above the protective material sheet to transfer the hot-melt transparent protective material to a plurality of spots which are independent of each other on the surface of the printed frame of picture so that a overcoated hot-melt transparent protective material has a predetermined pattern.

The above more specific object is attained by the aforementioned method, wherein, when pressing and heating the thermal head system while moving the recording medium, the thermal head system is preheated at first in a temperature range in which the hot-melt transparent protective material does not melt and, when the recording medium reaches to a predetermined position from the thermal head, a heating amount of the thermal head system is increased to start transferring of the hot-melt transparent protective material.

The above another object is attained by another method for transferring a hot-melt transparent protective material comprising steps of:

contacting an ink sheet having at least one or more color hot-melt ink layer being provided, with a moving recording medium;

pressing and heating a thermal head system having an array of heat elements from above the ink sheet to print certain information in each color and to form a frame of picture; contacting a protective material sheet having a hot-melt transparent protective material layer being provided, with a printed surface of the recording medium; and pressing and heating the thermal head system from above the protective material sheet to transfer the hot-melt transparent protective material plural times to the surface of the printed frame of picture so as to apply overcoats of the hot-melt transparent protective material thereon.

BRIEF DESCRIPTION OF THE DRAWINGS

Preferred embodiments of the present invention will be described with reference to the accompanying drawings wherein:

FIG. 4 is a flow chart showing operations of the card publishing system according to the present invention;

DETAILED DESCRIPTION OF THE PREFERRED EMBODIMENTS

Figure 1:
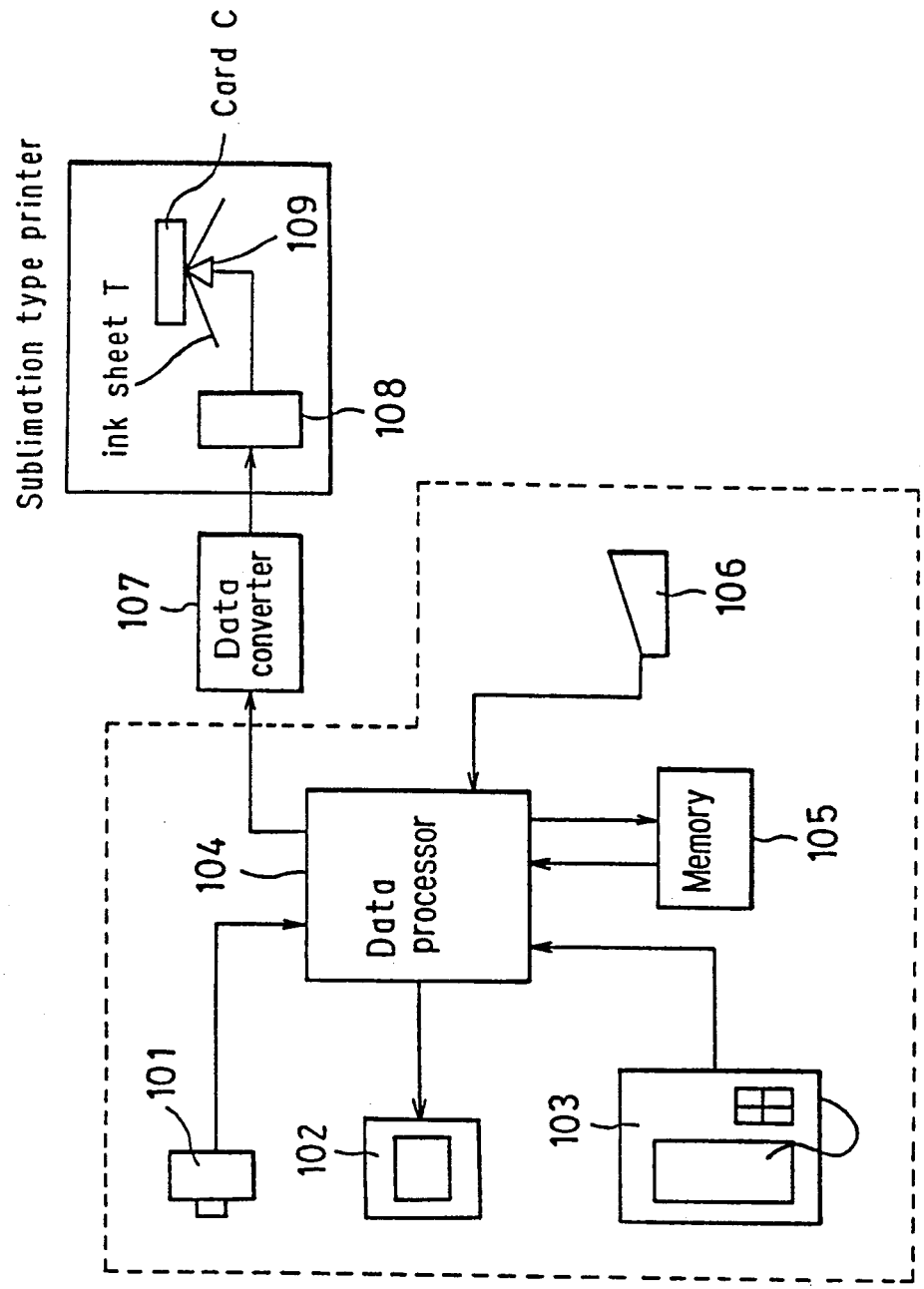
FIG. 1 is a schematic diagram of a prior art card production system.
Figure 2:
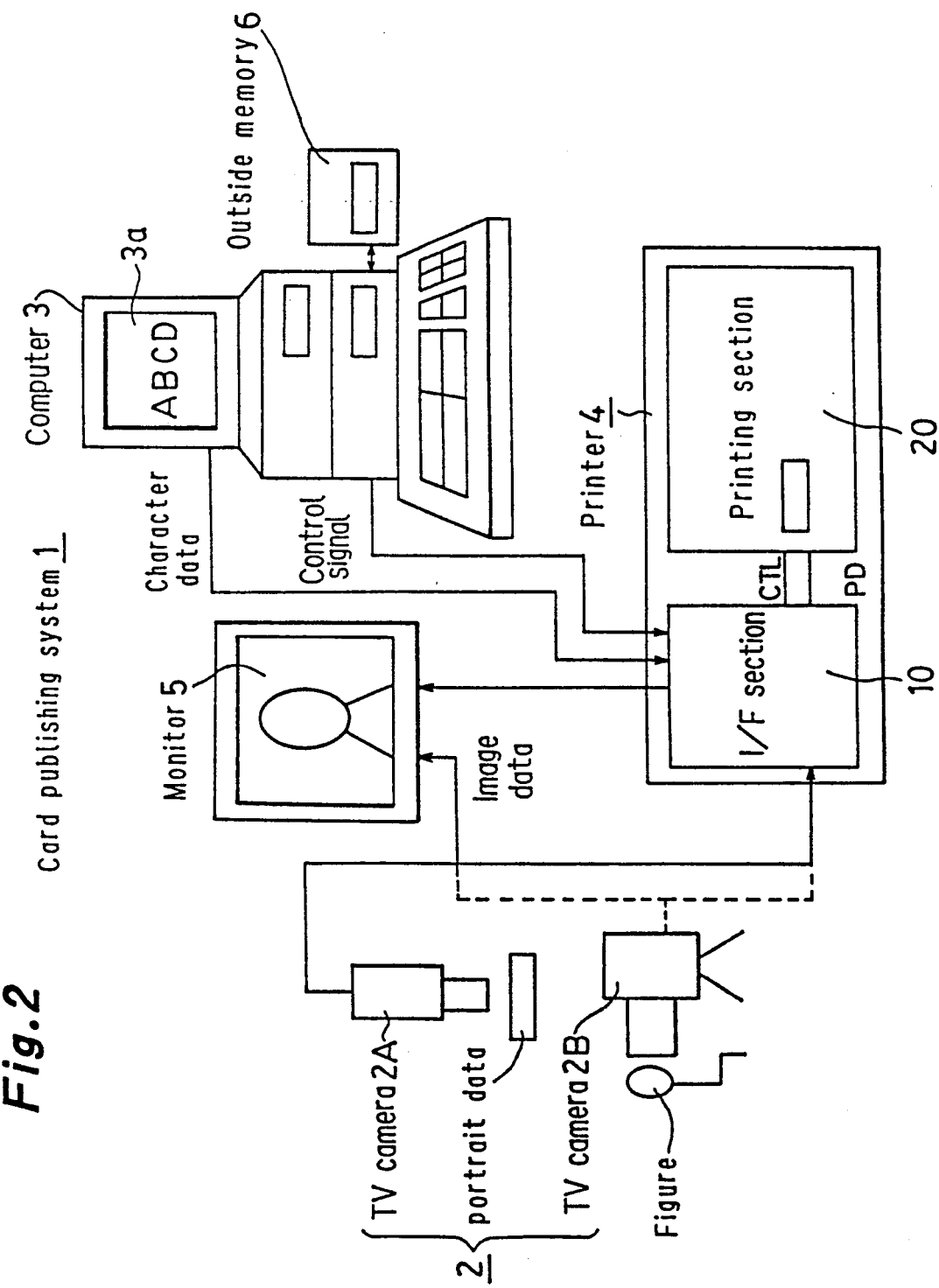
FIG. 2 is a schematic diagram illustrating a system structure of a card publishing system employed in a method for transferring a hot-melt transparent protective material of the present invention.
Figure 18:
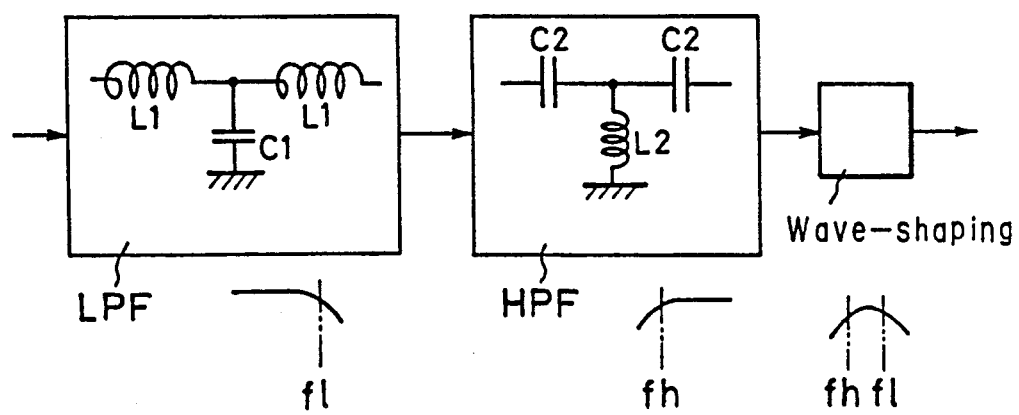

With reference to FIG. 2 or FIG. 18, one embodiment of the present invention will be explained in detail.

Outlined System Structure

Figure 3:
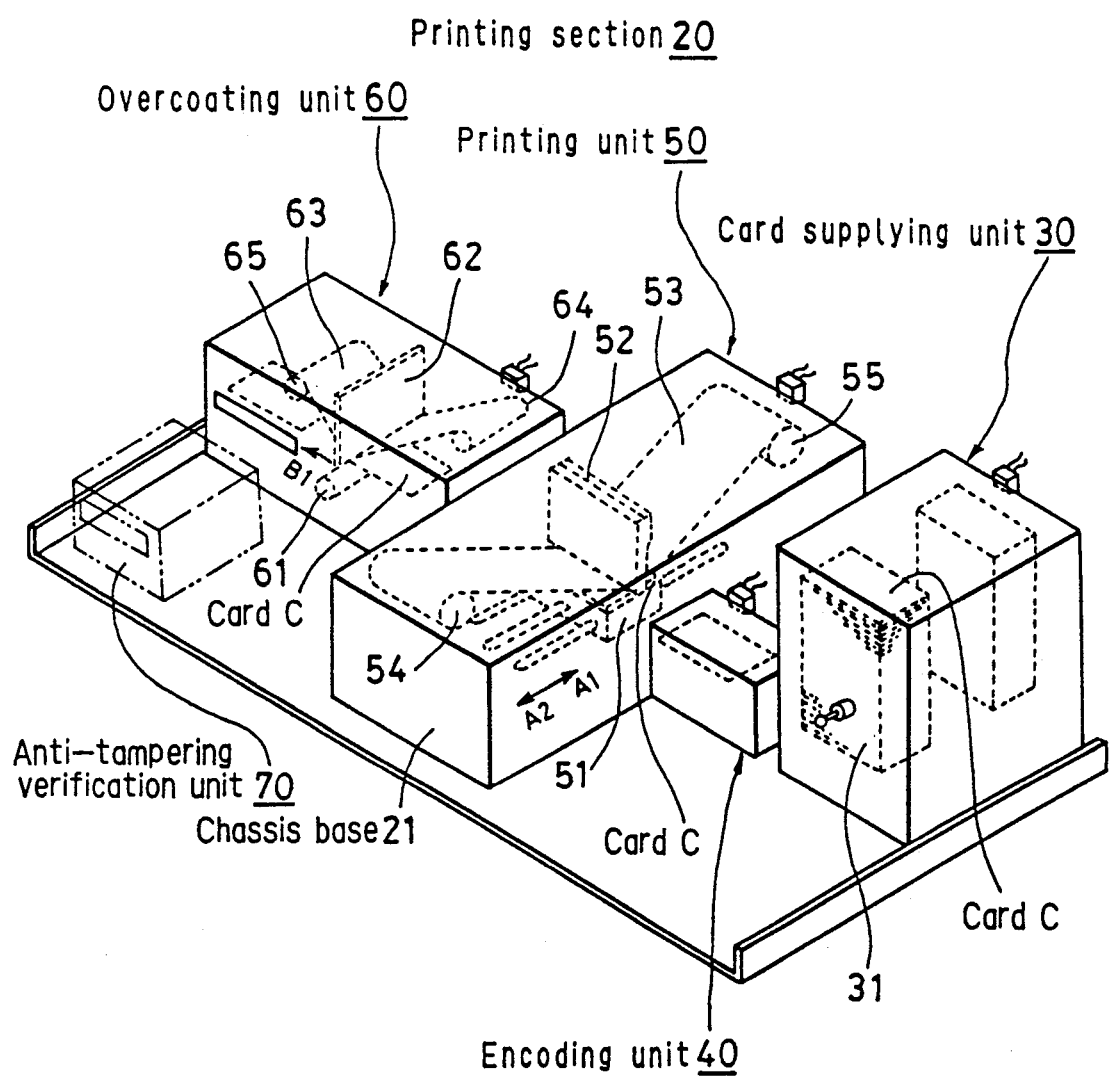
FIG. 3 is a perspective view illustrating a detailed structure of a printing section shown in FIG. 2.

Referring first to FIGS. 2 and 3, an outlined system structure of a card publishing system employed in a method for transferring a hot-melt transparent protective material according to the present invention will be explained. FIG. 2 is a schematic diagram showing the outlined system structure of the card publishing system and FIG. 3 is a perspective view illustrating in detail a structure of a printing section shown in FIG. 2.

In FIG. 2, the system of a card publishing system 1 is comprised of, in outline, an image data inputting device 2 for inputting desired image data, a character data inputting device 3 (hereinafter referred to as a "computer 3") for inputting desired characters and graphic data (hereinafter referred to as "character data"), an editing and processing section 10 (hereinafter referred to as a "I/F section 10") of a printer 4 comprising an interface section for processing inputted image data and storing the image data processed and character data inputted, a printing section 20 of the printer 4 for printing such desired information of the edited and processed image and character data on the surface of a card C (shown in FIG. 3) to be used as a recording medium, an image data display 5 (hereinafter referred to as a "monitor 5") for displaying the image data from the image data inputting device 2 or the image data stored in the I/F section 10, and a character data display 3a (hereinafter referred to as a "display 3a") for displaying the character data in the computer 3.

In FIG. 3, the printing section 20 is comprised of, in the order from the upper stream side of a transport path of the card C on a chassis base 21, a card supplying unit 30 having a card feeding means, an encoding unit 40 for magnetically encoding certain information as necessary on the card C, a printing unit 50 for printing desired information such as image and character data on the card C, an overcoating unit 60 for overcoating further the card C printed by the printing unit 50, and an anti-tampering verifying unit 70 for verifying an anti-tampering measure applied to the printed card C, when necessary.

Among the devices in the foregoing system, the card supplying unit 30 has been described in Japanese Patent Application No. 12940/1992, the printing unit 50 has been described in Japanese Laid Open Patent Application No. 249609/1990 and the overcoating unit 60 has been described in Japanese Laid Open Patent Application No. 175063/1991, respectively in detail, all of which are filed by the present applicant, so that those units will be described briefly in this application and their details should be referred to the above applications.

The aforementioned card supplying unit 30 is structured so that a number of cards C are piled up in a cassette 31 and are transported to the encoding unit 40 one by one by the card feeding means (not shown).

The encoding unit 40 is structured so that it can magnetically encode desired information on the card C as necessary and the cards C are transported to the adjacent printing unit 50.

The printing unit 50 utilizes a thermal transfer type printer system and is comprised of a card stage 51 on which the card C is placed, having a platform to be capable of transporting the cards in the directions of arrows A1 and A2 by a driving source (not shown), a first line thermal head 52 on which an array of heat elements is disposed approximately at a right angle to the transporting directions of A1 and A2 and an ink sheet 53 which is rolled on a pair of rollers 54 and 55 and on which at least one color or more ink is provided on a base film thereof. The cards C printed here are transported to the next overcoating unit 60 by means of transporting mechanism like rollers. Provided on the base film of the ink sheet 53 are ink layers of a plurality of colors, for example, yellow (Y), magenta (M), cyan (C) and black (BK) arranged in a predetermined sequence as a predetermined pattern so that each ink layer of the plurality of colors) covers one frame of picture to be printed. The pattern is repeated in the longitudinal direction of the base film.

The aforementioned overcoating unit 60 also adopts a thermal transfer type printer system and is comprised of a roller 61 rotatable for transporting the cards C in the direction of an arrow B1 by a driving source (not shown), a second line thermal head 62 in which an array of heat elements is disposed and a protective material sheet 63 which is rolled on a pair of rollers 64 and 65 and on whose base film a hot-melt transparent protective material is provided (refer to FIGS. 7 and 8) to overcoat the printed picture of multiple color inks previously transferred in the printing unit 50. Furthermore, after the overcoating, a result of an anti-tampering process is verified as necessary by an anti-tampering verifying unit 70 which is described later. The cards C are then ejected out of the system 1.

Figure 9:
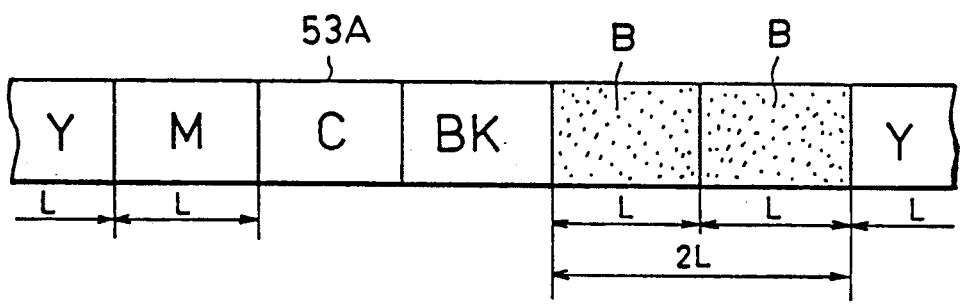
Figure 10:
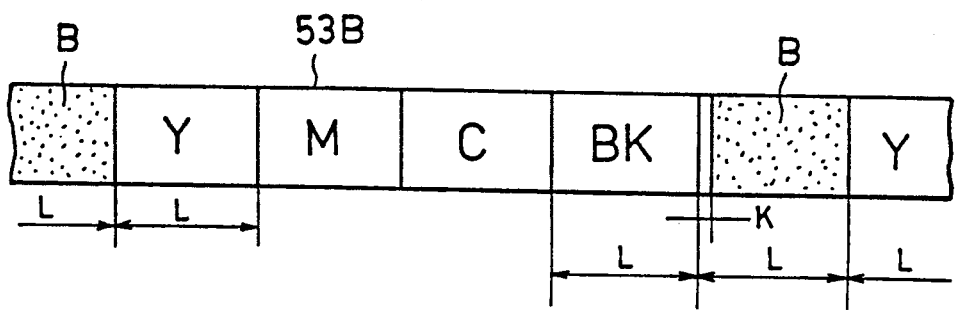

As another method for overcoating the hot-melt transparent protective material without having the overcoating unit 60, it is also possible, as described later, after the picture is printed in each color by the first line thermal head 52, the hot-melt transparent protective material is subsequently overcoated on the picture by using the same first line thermal head 52. In this case, the hot-melt transparent protective material is provided with the plurality of color inks in series as a subsequent part of the pattern of the ink sheet 53 used in the printing unit 50 (FIGS. 9 and 10).

Outlined System Operation

Figure 5:
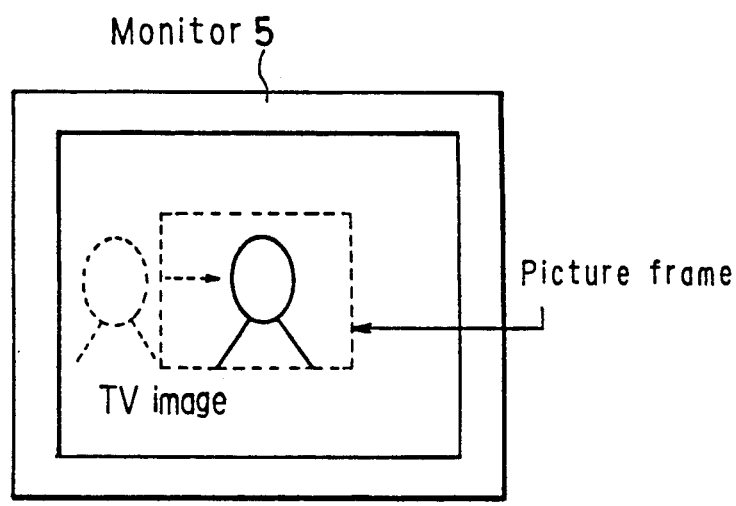
FIG. 5 shows an exemplary image of a monitoring display.
Figure 6:
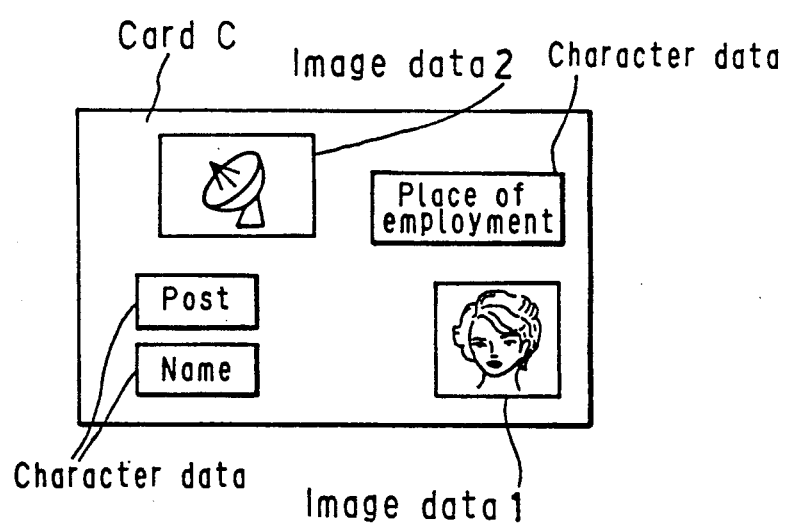
FIG. 6 shows an exemplary card printed by the card publishing system.

Referring now to FIGS. 2 through 6, the operation of foregoing card publishing system will be explained. FIG. 4 is a flow chart showing operations of the card publishing system, FIG. 5 shows an exemplary picture of the monitor display, and FIG. 6 shows an exemplary image printed on the card by the card publishing system.

As seen in FIGS. 2 and 4, TV cameras for example are used as the image data inputting device 2. A TV camera 2A picks up portrait data to produce image data. It is also possible to pick up a portrait of a person using a TV camera 2B to produce image data (at step S1 in FIG. 4). As for the image data inputting device 2, it may be adapted to use, for obtaining a plurality of image data, at least one or more TV cameras, or an image scanner (not shown) combined to the system. It may be also structured so that a certain information produced may be inputted from such recording mediums as magnetic disks or tapes, optical disks, etc.

The image data on the image data inputting device 2 is then displayed on a screen of the monitor 5 directly or via the I/F section 10 of the printer 4.

A picture frame is present on the screen of the monitor 5 as shown in FIG. 5. The image pickup condition of the TV camera 2A or the TV camera 2B is checked on the monitor 5, so that the camera 2A or the camera 2B is controlled to bring a portrait initially at the left in FIG. 5 into the frame and focused and the optimum condition of the image data in the frame is confirmed (at steps S2 in FIG. 4).

Then the image data set for the frame is stored in the I/F section 10 of the printer 4 in accordance with a control signal (at step S3 in FIG. 4).

The image data stored in the I/F section 10 is then read in response to a control signal and displayed on the screen of the monitor 5 again to reconfirm the rendition, position, size and other conditions of the portrait. When it is not satisfactory, the step is returned to step S3 in FIG. 4 to store again and to obtain the best conditioned image data (at step S4 in FIG. 4).

On the other hand, character data comprised of characters of a person's place of employment, post and name and of graphic image like corporate mark or school mark are prepared by means of the computer 3 (at step S5 in FIG. 4) and upon confirming on a display 3a of the computer 3 (at step S6 in FIG. 4), the character data are stored in the I/F section 10 in response to a control signal (at step S7 in FIG. 4). This character data to be used may be one which has been stored beforehand in an outside memory 6 and the prepared character data may be stored in the outside memory 6 as well.

When the steps S4 and S7 in FIG. 4 are completed, the image and character data stored in the section 10 are fixed. Here it is confirmed whether printing should be carried out based on the fixed image and character data (at step S8 in FIG. 4) and if it is found to be acceptable to print, the process proceeds to the operations of the printing section 20.

Now, with reference to FIGS. 3 and 4, the card supplying unit 30 in the printing section 20 is activated. The cards C piled in the cassette 31 are fed one by one (at step S9 in FIG. 4) from the bottom of the pile, which is to be transported to the encoding unit 40 where desired information are magnetically encoded on the card C. (at step S10 in FIG. 4).

The cards C are then placed one after another on the card stage 51 having a platform of the printing unit 50 and are started to be printed (at step S11 in FIG. 4).

Here a color of the ink sheet 53, yellow for example, is selected at first (at step S12 in FIG. 4) as the first color. Then, coordinating with the timing of the printing of the card C, the desired information like the image and character data stored in the I/F section 10 (FIG. 2) are read sequentially (at step S13 in FIG. 4) and the ink sheet 53 is contacted with the card C. And from above the ink sheet 53, the first line thermal head 52 is pressed while the card stage 51 is moved in the direction of the arrow A1. By being moved together with the card stage 51, the card C is scanned in the direction of A1 by the first line thermal head 52 and the yellow ink, the first color, is printed on the card C in correspondence with the encoding signal (at step S14 in FIG. 4). When the printing of the yellow color, the first color, ends, it is confirmed whether another color should be printed (at step S15 in FIG. 4), and if, for example, magenta is to be printed, the card stage 51 is brought back in the direction of the arrow A2 and the step S12 in FIG. 4 is repeated again. The third color (cyan) and the fourth color (black) may be printed in the same way, and when the printing of the fourth color ends, the image and character data are printed on the card C in full color as shown in FIG. 6 and the printing is now completed (at step S16 in FIG. 4).

A plurality of color inks has been transferred on the printed card C in correspondence with the desired information. The card C is then transported to the roller 61 of the unit 60. Here the protective material sheet 63 on which the hot-melt transparent protective material has been provided is contacted with the printed card C while rotating the roller 61 and the second line thermal head 62 is pressed from above the protective material sheet 63 to print the hot-melt transparent protective material over the picture of inks previously transferred on the card C. The hot-melt transparent protective material is thus overcoated as a protective layer on the cards C (at step S17 in FIG. 4).

As described before, in the method where the layer of the hot-melt transparent protective material is preliminary provided on the ink sheet 53 of the printing unit 50, the hot-melt transparent protective material is overcoated by the first line thermal head 52 subsequent to the printing of color inks by the same first line thermal head 52, accordingly, a detailed explanation of the process is omitted here.

When an overcoat for preventing tampering is provided, which will be described later, verification of an anti-tampering measure is carried out by an anti-tampering verifying unit 70 which is also described later (at step S18 in FIG. 4).

The cards C overcoated are then ejected out of the system (at step S19 in FIG. 4) and all the operations are now completed.

Overcoating Hot-melt Transparent Protective Material

Referring now to FIGS. 7 through 18, a method for providing an anti-tampering measure which is a part of the present invention, will be described in detail.

Figure 11:
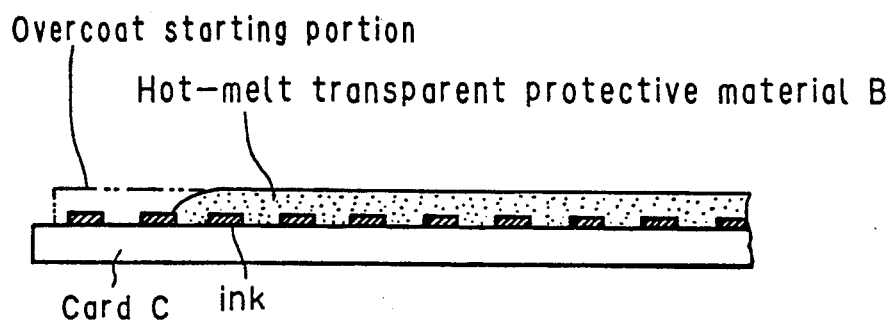
FIGS. 11 and 12 are sectional views illustrating states when the hot-melt transparent protective material has been transferred on a printed card.
Figure 12:
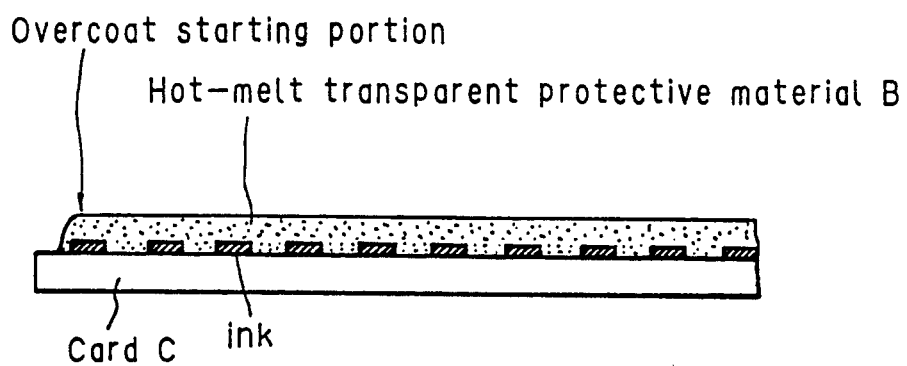
Figure 13:
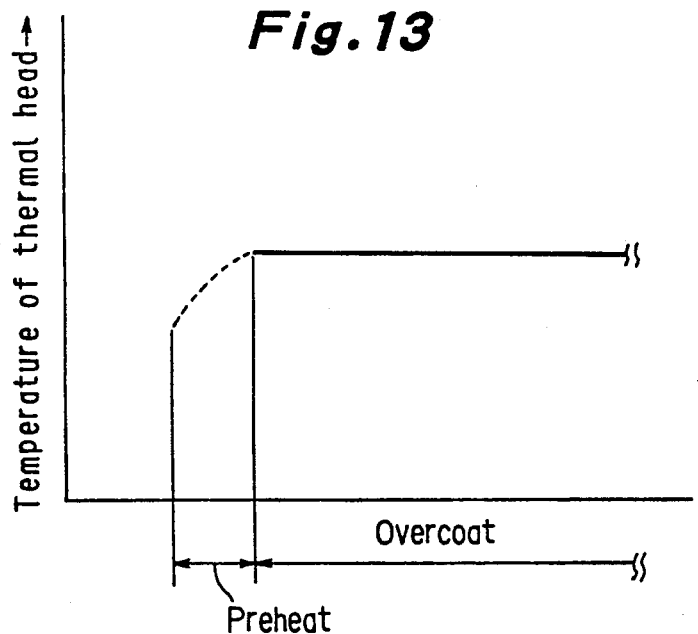
FIGS. 13 is a diagram showing a preheating operation of a line thermal head during overcoating.
Figure 14:
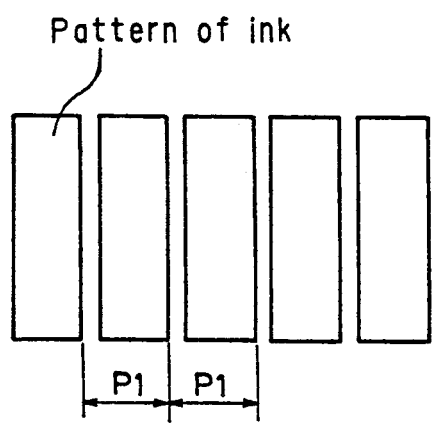
FIGS. 14 through 16 are views for describing a moire pattern produced as an anti-tampering measure.
Figure 15:
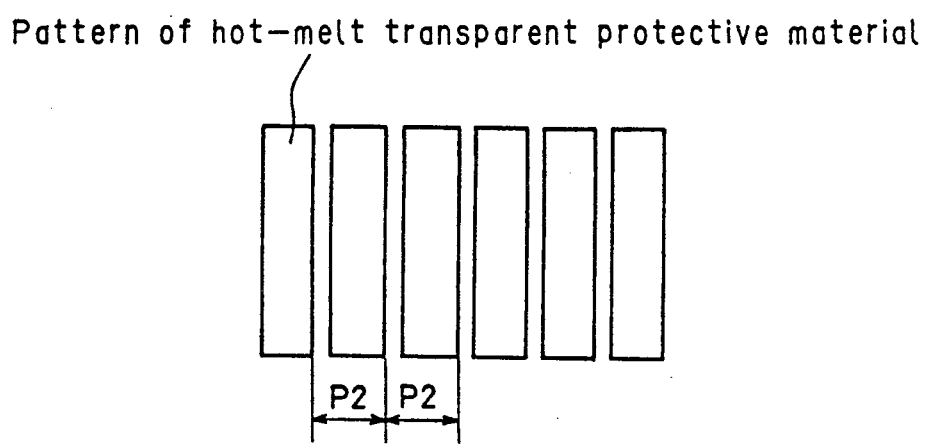
Figure 16:
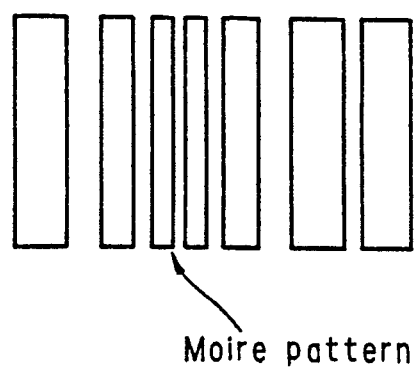
Figure 17:
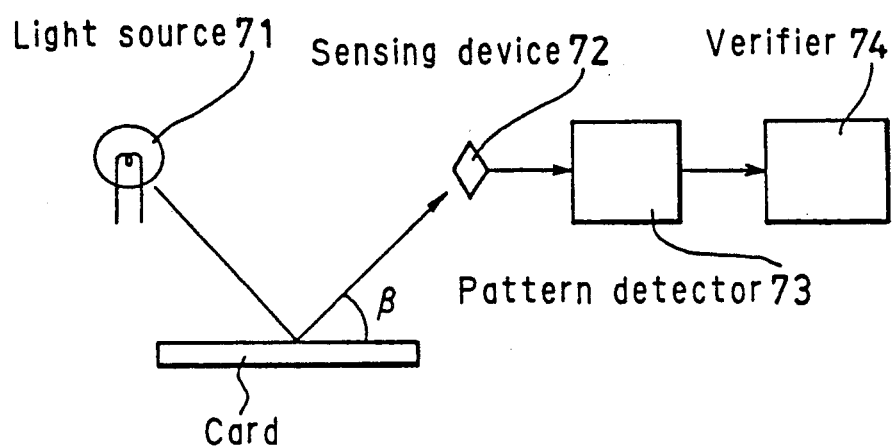
FIGS. 17 and 18 are schematic diagrams showing an anti-tampering verifying unit.

FIGS. 7 through 10 are schematic plan views showing protective material sheets on which the hot-melt transparent protective material has been provided and used for overcoating, FIGS. 11 and 12 illustrate conditions when the hot-melt transparent protective material is transferred onto printed cards, FIG. 13 is a diagram showing preheating operation of the line thermal head during the, FIGS. 14 through 16 are drawings for explaining a moire pattern as the anti-tampering measure, and FIGS. 17 and 18 are schematic diagrams showing configurations of the anti-tampering verifying unit 70.

Figure 7:
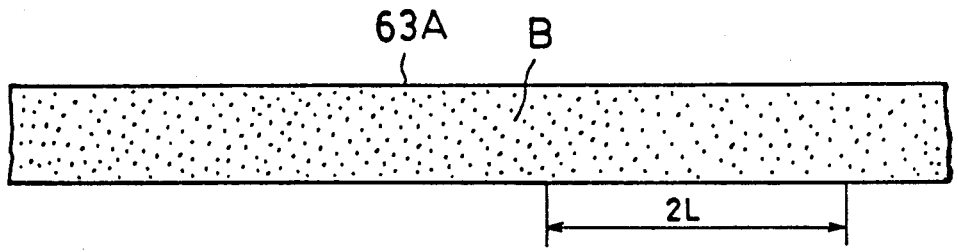
FIGS. 7 through 10 shows ink sheets on which hot-melt transparent protective material is provided.
Figure 8:
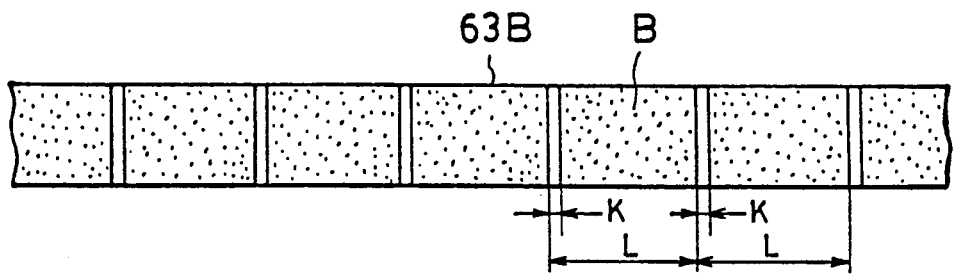

The protective material sheets 63A and 63B shown in FIGS. 7 and 8 are ones on which only an hot-melt transparent protective material B has been provided and are used for overcoating the cards C by the second line thermal head 62 in the overcoating unit 60 aforementioned. That is, the protective material sheet 63A shown in FIG. 7 has the hot-melt transparent protective material B being uniformly provided over the whole surface of its base film. However for the protective material sheet 63B shown in FIG. 8, the hot-melt transparent protective material B is not applied on the gaps K which divide the protective material B into segments with a pitch L to allow the preheating operation of the second line thermal head 62 to be performed at each of the gaps K as described later.

The ink sheets 53A and 53B shown in FIGS. 9 and 10 are provided with ink layers of at least one or more colors, for example, yellow (Y), magenta (M), cyan (C) and black (BK) are sequentially provided on base film and following and in addition to them, layers of the hot-melt transparent protective material are provided as consecutive segments to form a predetermined pattern including the color ink layers so as to repeat the pattern plural times in the longitudinal direction of the base film. These ink sheets 53A and 53B are used when the hot-melt transparent protective material B is overcoated in addition to the aforementioned color inks on the cards C printed by the first line thermal head 52 in the printing unit 50. That is, in the ink sheet 53A shown in FIG. 9, whereas a portion on which one color ink is provided has a length of L, another portion on which the hot-melt transparent protective material B is provided has a length that permits plural times of overcoatings (in FIG. 9, the length is 2L for two times of overcoating). In the ink sheet 53B shown in FIG. 10 there is a gap K between the end of the ink portion (BK) and the portion of the hot-melt transparent protective material B, where neither of the color inks nor the hot-melt transparent protective material B is provided. During a time corresponding to the gap K to travel, a preheating operation of the first line thermal head 52 is performed as described later.

When overcoating the hot-melt transparent protective material on the card C by means of the heat elements of the second line thermal head 62 or the heat elements of the first line thermal head 52 using such protective material sheets 63A and 63B or the ink sheets 53A and 53B described above, due to the fact that the layer of the hot-melt transparent protective material provided on the base film is thick, the thermal output of the heat elements of the line thermal head 62 or 52 sometimes falls short in the beginning of transferring of the hot-melt transparent protective material B on the card C, so that the hot-melt transparent protective material B is not adequately melted and fails to be transferred onto the overcoat starting portion as shown by a two-dot chain line in FIG. 11.

In order to deal with this problem, the present invention adopts the following methods 1) or 2) to transfer the hot-melt transparent protective material B uniformly on the printed card C.

In the method 1) the transfer of the hot-melt transparent protective material B is repeated at least two(2) times on the card C on which a frame of picture is previously printed by transferring each of at least one or more color inks. The method 1) allows to overcoat by the heat elements of the second line thermal head 62 of the overcoating unit 60 using a portion having the length 2L of the protective material sheet 63A in FIG. 7, or allows to overcoat by the heat elements of the first line thermal head 52 of the printing unit 50 using two(2) segments of the protective material having a total length of 2L on the ink sheets 53A shown in FIG. 9. For this, the length L is almost equal to the length of the card C and the length 2L is equal to two times of needed overcoating length. When overcoating is repeated plural times, the heat elements of the line thermal heads 62 or 52 are fully warmed up. As a result, the transfer dropouts of the hot-melt transparent protective material are eliminated, thus the hot-melt transparent protective material B is uniformly transferred onto the card C including the overcoat starting portion as shown in FIG. 12 and the durability of the card C is also enhanced. It should be noted that when the overcoating is repeated plural times in the overcoating unit 60, the card stage structure having a platform (i.e. the card stage 51) which is movable, is effective to shuttle back and forth the card C placed on it rather than transporting the card C alone by the roller 61 and that it is easier to depress the second line thermal head 62 against the card C in this arrangement.

In the method 2), the heat elements of the second line thermal head 62 or those of the first line thermal head 52 is preheated in the manner shown in FIG. 13 and right after the preheat the overcoating is performed on the card C on which a frame of picture is previously printed by transferring each of at least one or more color inks. The method 2) allows the second line thermal head 62 being preheated during a time corresponding to each of the gaps K of the protective material sheet 63B shown in FIG. 8 or allows the first line thermal head 52 being preheated during a time corresponding to the gap K on the ink sheet 53B shown in FIG.10. In other words, this is a method in which, when the protective material sheet 63B shown in FIG. 8 is used, the protective material sheet 63B is contacted with the card C from the a leading edge of the gaps K in which the hot-melt transparent protective material B is not provided, the second line thermal head 62 is pressed from above the protective material sheet 63B, the protective material sheet 63B and the card C are moved together while causing preheating operation of the heat elements of the second line thermal head 62 in the temperature range in which the hot-melt transparent protective material B is not melted thus not transferred to the card C, and when the protective material sheet 63B and the card C reach to a predetermined position where the transfer of the hot-melt transparent protective material should be started, the drive i.e. the heating amount of the heat elements of the second line thermal head 62 is raised to a temperature range in which the hot-melt transparent protective material B is well melted thus starts to transfer to the card C to overcoat the card C. When the ink sheet 53B shown in FIG. 10 is used, this method 2) causes the heat elements of the first line thermal head 52 being preheated during a traveling time of the gap K of the ink sheet 53B on which the hot-melt transparent protective material B is not provided. This method allows the heat elements of the line thermal head 52 being fully warmed up. As a result, the dropouts of the hot-melt transparent protective material B are eliminated during the subsequent overcoating. Similarly to the method 1), as shown in FIG. 12, this method allows to transfer the hot-melt transparent protective material B uniformly on the card C including the overcoat starting portion and to enhance the durability of the card C. It is also possible to have the hot-melt transparent protective material B being provided in the gaps K eliminating such gaps, to use such ink sheets, the heat elements of the line thermal head 52 is preheated in a temperature range in which the hot-melt transparent protective material B is not melted so as not to be transferred to card C while such sheets travel a distance corresponding to the gaps k.

Next, an anti-tampering measure to prevent the cards C from tampering by overcoating the hot-melt transparent protective material B on the cards C, will be explained.

The object of this anti-tampering is to prevent tampering with the printed information on the card C, by printing the overcoated protective material in such a manner which presents, under a certain light condition, a specific moire pattern designed to each user of the card C as described below.

As a matter of fact, the image on the card C after the step S16 shown in FIG. 4, is printed as a stripe ink pattern approximately extending at a right angle to the relative movement direction of the first line thermal head 52 (the angle to the movement direction of the card stage 51, A1 or A2, in the present embodiment) as shown in FIG. 14. The stripe ink pattern is formed because the array of the heat elements of the first line thermal head 52 is heated per each line of the image to be printed and its transfer pitch P1 is determined by the moving speed of the card C and the cyclic period of the heating of the array of the heat elements.

When overcoating the hot-melt transparent protective material B on the surface of one frame of the picture formed by printing each color, the second line thermal head 62 is cyclically heated so as to produce over the surface of the printed picture, a stripe of the hot-melt transparent protective material having a pitch P2 which is slightly different from the pitch P1 as shown in FIG. 15. As a result, a moire pattern is produced as shown in FIG. 16 because an interference pattern is created between the stripe ink pattern and the stripe pattern of the hot-melt transparent protective material. The ink transfer pitch P1 is determined by the transport speed of the card C in the direction of the arrow A1 (FIG. 3) and the driving cycle of the first line thermal head 52 and the pitch P2 of the hot-melt transparent protective material is determined by the transport speed of the card C in the direction of arrow B1 (FIG. 3) and the driving cycle of the second line thermal head 62. When overcoating by the first line thermal head 52 in the printing unit 50, the transport speed of the card C in the direction of the arrow A1 or the driving cycle of the first line thermal head 52 is controlled so that the ink transfer pitch P1 and the hot-melt transparent protective material transfer pitch P2 slightly differ each other.

After overcoating the hot-melt transparent protective material as described above, the moire pattern is verified by the anti-tampering verifying unit 70 shown in FIG. 17. Although the anti-tampering verifying unit 70 shown in FIG. 17 is disposed within the card publishing system 1 shown in FIG. 3, it is not necessarily confined within the system and is possible to provide the anti-tampering verifying unit 70 as a separate unit.

The anti-tampering verifying unit 70 spotlights on the card C from a light source 71, reflects it with a angle in a specific direction, senses the light by a plurality of sensing devices 72 or a TV camera (not shown), converts it to an electrical signal and detects the moire pattern by a pattern detector 73. Then a verifier 74 verifies whether the detected moire pattern is the predetermined specific pattern. The pattern detector 73 includes a wave-shaper which wave-shapes its output signal after limiting its frequency range by an LPF (low pass filter) having a cutoff frequency "fl" and an HPF (high pass filter) having a cutoff frequency "fh" as shown in FIG. 18 for example. The wave-shaped signal is sent to the verifier 74 and is judged whether it reaches a certain level to detect the moire pattern of its existence. Furthermore, values of L1 and C1 composing the LPF and of L2 and C2 composing the HPF are determined in accordance with a spatial frequency of the moire pattern. This enables to design and detect various frequencies of the moire pattern to be assigned to respective users. Having the overcoat presenting such a specific moire pattern, tampering with the contents of the cards C is prevented and the functions of the system 1 is increased.

Although a moire pattern which is produced between the stripe pattern produced from the ink sheet and another stripe pattern of the hot-melt transparent protective material has been described in the present preferred embodiment, a specific interference pattern produced between dot patterns, instead of those two stripes, of the printing ink and the hot-melt transparent protective material may be used as an anti-tampering measure utilizing the fact that a frame of the printed picture is composed of dots because each of the line thermal heads used is comprised of a plurality of heat elements. It is also possible to use a specific printing pattern of the overcoat hot-melt transparent protective material itself, without relying on the previously explained interference patterns, as a pattern for anti-tampering measure, though its anti-tampering effect may be smaller compared with the effect of the interference patterns. Such specific printing pattern of the hot-melt transparent protective material may be produced by controlling a driving cycle of the line thermal head in a specific pattern. Furthermore, the hot-melt transparent protective material needs not be totally transparent after being transferred instead it may be smoked or color-tinted semitransparent for an aesthetic reason.

As described above, according to the present invention, one method for transferring the hot-melt transparent protective material comprises steps of; contacting the ink sheet on which at least one or more color hot-melt ink layers have been provided, with the moving card C, pressing and heating the thermal head system having an array of heat elements from above the ink sheet, contacting the protective material sheet on which the hot-melt transparent protective material layer has been provided, with the printed surface of the card C after printing desired information in each color and forming a frame of picture, pressing and heating the thermal head system from above the protective material sheet, transferring the hot-melt transparent protective material to a plurality of spots which are independent of each other on the surface of the frame of the picture to overcoat a specific pattern of the hot-melt transparent protective material.

As a result, the card on which the hot-melt transparent protective material has been overcoated has a specific moire pattern per each card user, so that tampering with the printed contents on the card can be prevented.

Furthermore in another method for transferring the hot-melt transparent protective material, when the thermal head system is pressed and heated while moving the card C, the thermal head system is preheated in a temperature range in which the hot-melt transparent protective material is not melted, and when the card C reaches to a predetermined position from the thermal head, a heating amount of the thermal head system is then increased to start transferring of the hot-melt transparent protective material.

As a result, the heat elements of the line thermal head are fully warmed up toward the end of the preheating operation, so that the transfer dropouts of the hot-melt transparent protective material are eliminated during the overcoating, the hot-melt transparent protective material is transferred uniformly on the card including the overcoat starting portion thus the durability of the card C is enhanced.

Furthermore, still another method for transferring the hot-melt transparent protective material is comprised of steps of;

contacting the ink sheet on which at least one or more color hot-melt ink layers have been provided, with the card C, pressing and heating the thermal head system having an array of heat elements from above the ink sheet, contacting the protective material sheet on which the hot-melt transparent protective material layer has been provided, with the printed surface of the card after printing desired information in each color and forming a frame of picture, pressing and heating the thermal head system from above the protective material sheet, and transferring the hot-melt transparent protective material plural times on the surface of the printed frame of picture to overcoat the hot-melt transparent protective material thereon.

In this transfer process the heat elements in the line thermal head is fully warmed up to melt the protective material adequately. As a result, a possible transfer dropouts of the hot-melt transparent protective material are eliminated during the overcoating, and the hot-melt transparent protective material can be uniformly transferred on the card and the durability of the card C is enhanced.

What is claimed is:

1. A method for transferring a hot-melt transparent protective material comprising steps of:

contacting an ink sheet having at least one or more color hot-melt ink layers provided thereon, with a recording medium;

pressing and heating thermal head means having an array of heat elements from above said ink sheet to print information in each color to form a frame of picture on said recording medium by moving said recording medium together with said ink sheet in contact therewith with respect to said thermal head means;

contacting a protective material sheet having a hot-melt transparent protective material layer provided thereon, with a printed surface of said recording medium; and pressing and heating said thermal head means from above said protective material sheet to transfer said hot-melt transparent protective material to a plurality of spots which are independent of each other on a surface of said frame of picture and to apply thereon an overcoat of said hot-melt transparent protective material having a predetermined pattern by moving said recording medium together with said protective material sheet in contact with said printed surface with respect to said thermal head means.

2. The method according to claim 1, wherein said thermal head means is comprised of first and second thermal heads, said first thermal head pressing and heating said ink sheet and then said second thermal head pressing and heating said protective material sheet to apply said overcoat of said hot-melt transparent protective material.

3. The method according to claim 1, wherein said thermal head means is repeatedly heated to produce a printed pattern on said printed surface previously printed with said ink sheet and to generate a specific interference pattern between said printed pattern and said predetermined pattern of said hot-melt transparent protective material.

4. The method according to claim 3, wherein said thermal head means is pressed and heated so that said printed pattern and said predetermined pattern are formed as stripes respectively extending approximately in a same direction, and pitches of respective stripes slightly differ each other.

5. The method according to claim 1, wherein, when said thermal head means is pressed and heated while moving said recording medium, said thermal head means is preheated in a temperature range in which said hot-melt transparent protective material does not melt and when said recording medium reaches to a predetermined position from said thermal head, a heating amount of said thermal head means is then increased to start to transfer said hot-melt transparent protective material.

* * * * *